June 26, 1934.  H. SCHREIBER  1,964,535
MEANS FOR SECURING ELECTRICAL DEVICES IN OUTLET BOXES
Filed July 15, 1930
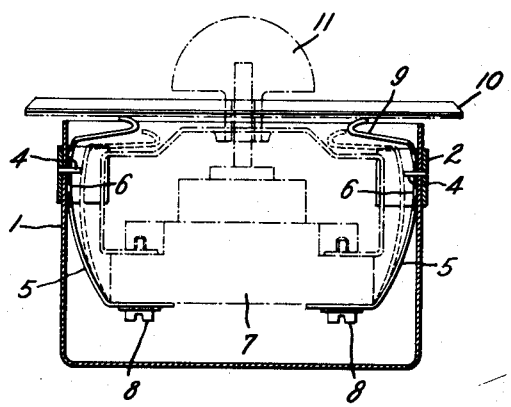
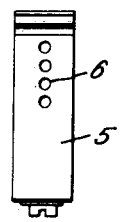
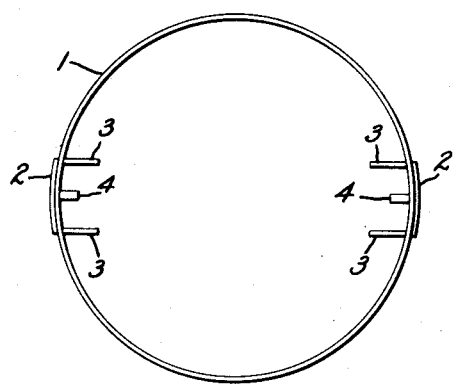
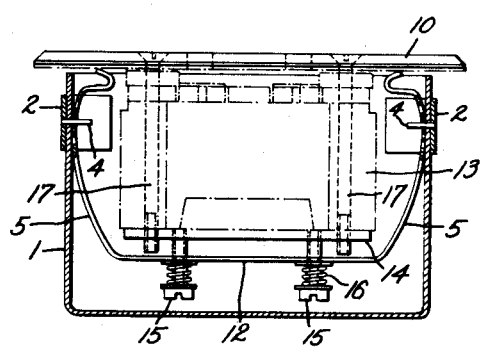
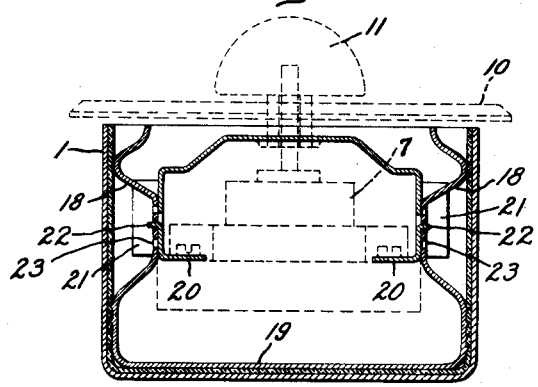
Inventor:
Hans Schreiber,
by Charles V. Tullar
His Attorney.

Patented June 26, 1934

1,964,535

UNITED STATES PATENT OFFICE 1,964,535

MEANS FOR SECURING ELECTRICAL DEVICES IN OUTLET BOXES

Hans Schreiber, Berlin-Steglitz, Germany, assignor to General Electric Company, a corporation of New York Application July 15, 1930, Serial No. 468,047
In Germany September 2, 1929

1 Claim. (Cl. 247—20)

The present invention relates to electrical house wiring and more especially to outlet boxes and the means for securing therein the electrical devices, such as flush switches and plug receptacles.

Much difficulty has been experienced heretofore in mounting and fastening the electrical devices in outlet boxes so that they align accurately with the surface of the wall in which the outlet box is installed.

The object of my invention is the provision of improved means for securing electrical devices in outlet boxes which shall not require the use of tools or special skill to operate, which shall effectively hold the electrical devices in proper adjusted position, and which may be manufactured at reasonable cost.

For a better understanding of the invention, reference may be had to the accompanying drawing in which Fig. 1 is a vertical section of an outlet box with an electrical switch and flush plate connected thereon; Fig. 2 is a plan of the outlet box; Fig. 3 is an elevation of a detail; Fig. 4 is a view similar to Fig. 1 showing a plug receptacle mounted in an outlet box; and Fig. 5 is a like view showing a modification.

The outlet box 1, which may be any of the well known constructions now in use and adapted to be installed in the house wall as customary, as shown in Figs. 1, 2 and 4, has its opposite walls provided with pairs of parallel slits in which two U-shaped sheet metal guide clips 2 are fixedly installed so that the parallel legs 3 thereof extend into the interior of the box a short distance. Midway between each pair of legs 3, a radial stud 4 is fixed by riveting.

The means for attaching an electrical switch, as indicated in Figs. 1 and 3, consists of two leaf spring arms 5, each provided with a series of holes 6 and respectively secured to the bottom ends of the switch base 7 by set screws 8, and their outer free ends are reversely bent to provide hand-holds 9. The spring arms 5 are of a width to fit easily between the legs 3 of the box clips 2, so that to install a switch provided with such spring arms in the outlet box it is necessary only to introduce the spring arms between the legs and press them toward each other sufficiently to clear the studs 4 and enter the switch the proper distance within the box and release the springs which recoil outwardly and cause the studs 4 to enter the nearest adjacent holes 6 of the respective series. The finish or flush plate 10 is installed thereover and the switch-operating handle 11 connected.

Where it is desired to accomplish a greater degree of fineness of adjustment than the series of recesses or holes 6 permit, I employ the arrangement shown in Fig. 4 in which the spring arms 5 are formed at the ends of a single strip 12 which is secured to the bottom of the electrical device, which in this case is a plug receptacle 13, by means of a tapped plate 14 fastened to the base of the device 13 and attachment screws 15 passing through the strip 12 and engaging the tapped plate 14, and between the strip 12 and the heads of the screws 15 are stiff helical springs 16. The receptacle 13 is installed in the same manner as the switch 7 above described. After the finish plate 10 has been positioned, it is attached by means of two set screws 17 which engage the tapped plate 14 and extend into abutting contact with the strip 12. On account of the face plate 10 resting against the face of the wall, its position is fixed and turning home of the set screws 17 serves to draw the electrical receptacle 13 toward the plate 10 against the reaction of the springs 16 until the front of the receptacle is in desired relation to the plate.

In the modification shown in Fig. 5, the provision of the outlet box 1 with the guide clips 3 is dispensed with by providing the spring arms 18 at the ends of a yoke 19 adapted to frictionally engage the inner side walls of the box 1 and rest upon the bottom thereof. The electrical device, in the form of a switch 7, has attached to its base two brackets 20 with guide legs 21 at opposite edges thereof adapted to embrace the spring arms 18 and between the legs are radial studs 22 adapted to engage the series of holes 23 in the spring arms. The spring arms 18 are bowed inwardly at their mid lengths to press against the brackets 20, while the upper and lower portions thereof press against the side walls of the box. In the installation of the switch in the box, the spring arms of the yoke 19 are snapped upon the radial studs 22 and the whole assembly forced into the box where it is retained in place by friction against the box walls and thereafter the face plate 10 and the switch handle 11 connected as in the first case.

What I claim as new and desire to secure by Letters Patent of the United States, is:

The means for securing an electrical device in an outlet box comprising two spring arms attached to said device and provided with series of spaced recesses, said spring arms having hand holds at the free ends thereof, said outlet box having two guide clips adapted to engage opposite edges of said spring arms, and radial studs fixed therein and selectively to engage the recesses of said spring arms.

HANS SCHREIBER.